Sept. 20, 1960 J. H. HOGSTROM 2,953,390
TRAILER CONSTRUCTION
Filed May 22, 1957 3 Sheets-Sheet 1
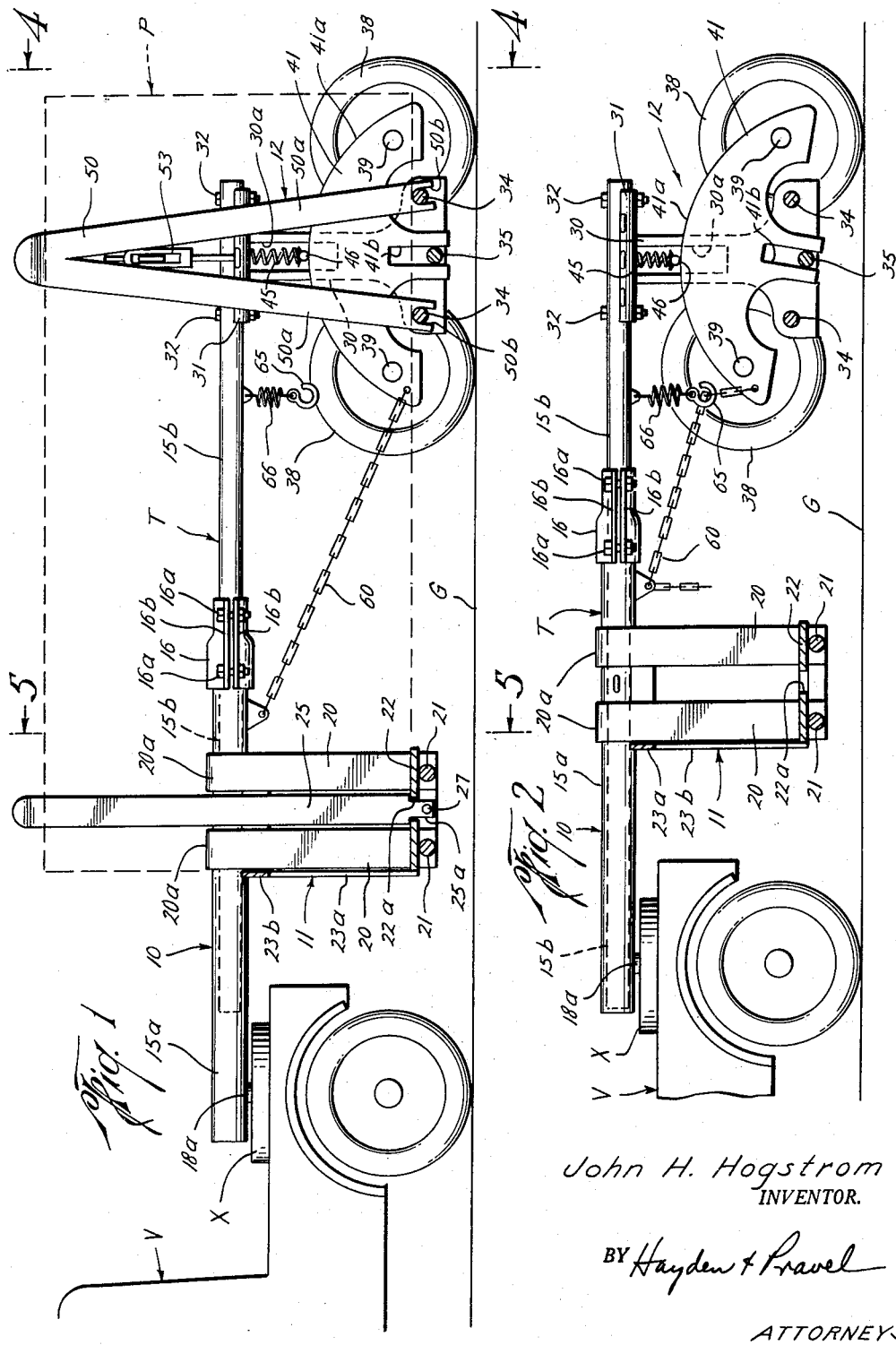
John H. Hogstrom
INVENTOR.
BY Hayden & Pravel
ATTORNEYS Sept. 20, 1960   J. H. HOGSTROM   2,953,390
TRAILER CONSTRUCTION
Filed May 22, 1957   3 Sheets-Sheet 2
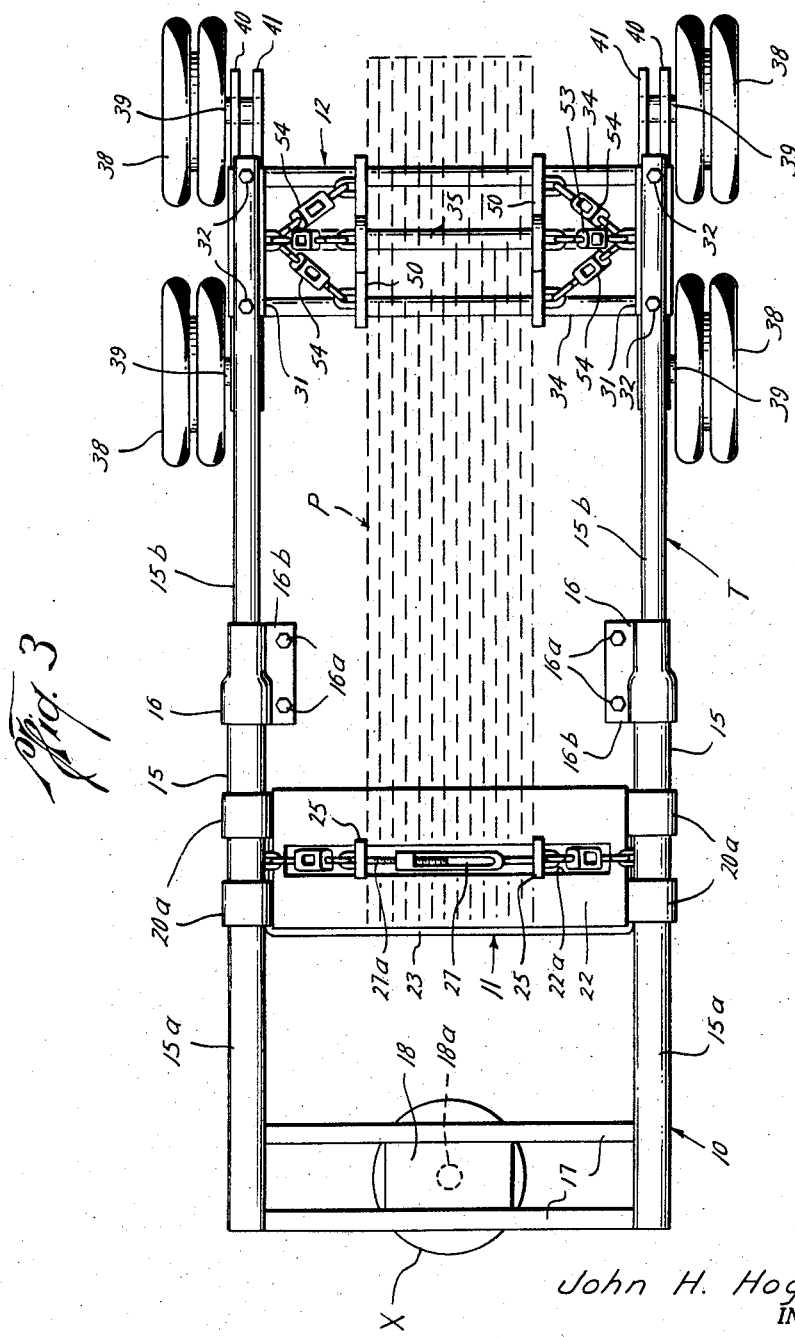
John H. Hogstrom
INVENTOR.
BY Hayden & Pravel
ATTORNEYS Sept. 20, 1960 J. H. HOGSTROM 2,953,390
TRAILER CONSTRUCTION
Filed May 22, 1957 3 Sheets-Sheet 3
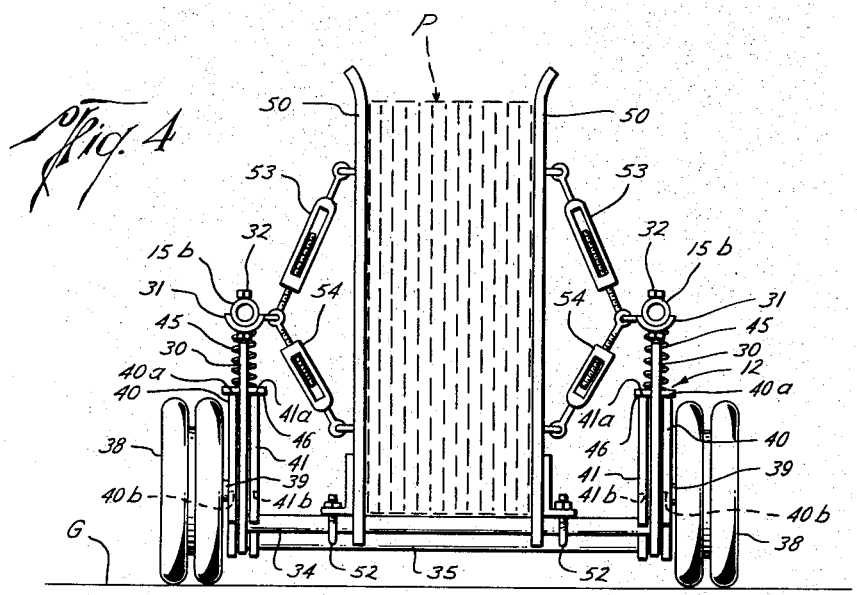
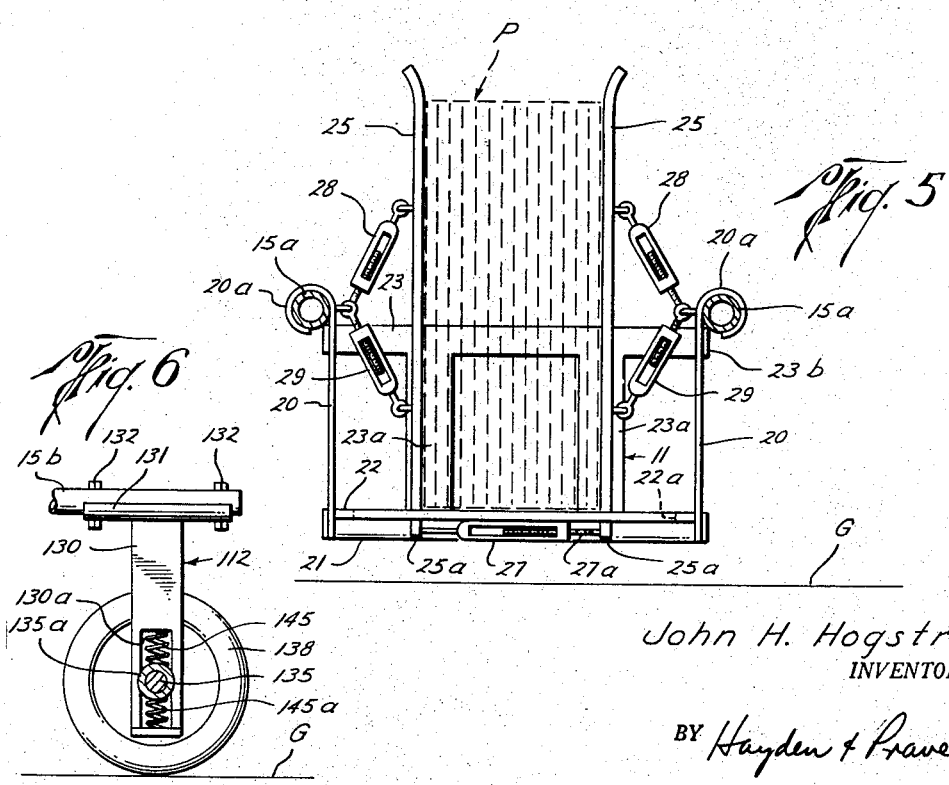
John H. Hogstrom
INVENTOR.
BY Hayden & Pravel
ATTORNEYS

United States Patent Office 2,953,390
Patented Sept. 20, 1960

2,953,390

TRAILER CONSTRUCTION

John H. Hogstrom, Houston, Tex.
(1310 Wichita St., Pasadena, Tex.)

Filed May 22, 1957, Ser. No. 660,842

3 Claims. (Cl. 280—104.5)

This invention relates to new and useful improvements in trailer constructions, and particularly to a trailer construction for transporting plates or sheets in a substantially vertical position.

At the present time, sheets or plates of steel and other materials are stacked flat or horizontally on the trailer beds for hauling purposes. Due to the road limitations and highway regulations, the width of such sheets or plates is limited when they are hauled in such flat or horizontal stacks. Also, considerable difficulty is encountered in the loading and unloading of such sheets or plates from the usual trailers because the handling or manipulating of the sheets or plates to different positions when they are in the flat or horizontal position is awkward and cumbersome, the stacking of the plates or sheets with the edges thereof in alignment for a balanced symmetrical load is also difficult, and the lifting or separating of the sheets or plates from each other when they are horizontally stacked is especially tedious and time-consuming.

It is an object of this invention to provide a new and improved trailer construction wherein plates or sheets of steel and other material are adapted to be supported in a substantially vertical position for hauling same, whereby the disadvantages of supporting such plates or sheets in a flat or horizontal position for hauling are eliminated.

Another object of this invention is to provide a new and improved trailer construction for supporting plates or sheets of steel or other material in a substantially vertical position and with the lower edges of such plates or sheets substantially parallel to the horizontal surface of the highways or roads.

A particular object of this invention is to provide a new and improved trailer wherein means are provided for supporting plates or sheets of steel or other material in a substantially vertical position for the transportation thereof, and wherein means are also provided for forcing the plates or sheets rearwardly from the trailer to unload same.

A further object of this invention is to provide a new and improved trailer which is adapted to be pulled by a truck or other vehicle, wherein plates or sheets of steel or other material are adapted to be supported thereon in a substantially vertical position, and wherein the rear portions of the plates or sheets are supported on a wheel assembly having means therewith for absorbing shocks occasioned by the contact of the wheels with bumps or surface irregularities in the roads over which the trailer is pulled.

Still another object of this invention is to provide a new and improved trailer which is adapted to be loaded and unloaded from the rear of the trailer with plates or sheets positioned substantially vertically.

A still further object of this invention is to provide a new and improved trailer for supporting plates or sheets in a substantially vertical position, wherein the body is constructed for telescoping to reduce or enlarge the length of the body to accommodate various sizes of the plates or sheets, to also shorten the length of the trailer for maneuverability when the trailer is empty, and to adjust the position of the rear support wheels for properly distributing the weight of the plates or sheets to the body.

An additional object of this invention is to provide a new and improved trailer that is extremely lightweight as compared to conventional trailers for transporting plates or sheets of steel and similar material, whereby a greater weight of the plates or sheets can be carried with the trailer of this invention without exceeding the highway regulations as to the maximum weight permitted.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Fig. 1 is a view, partly in elevation and partly in section, illustrating the preferred form of the trailer of this invention;

Fig. 2 is a view similar to Fig. 1, but illustrating the trailer in a telescoped or retracted position used when the trailer is empty;

Fig. 3 is a plan view of the trailer of this invention;

Fig. 4 is an end view taken on line 4—4 of Fig. 1 to illustrate the open rear end of the trailer for the loading and unloading thereof;

Fig. 5 is a sectional view taken on line 5—5 of Fig. 1 to illustrate the forward support means for the forward ends of the plates or sheets carried by the trailer; and Fig. 6 is a view, partly in elevation and partly in section, illustrating a modified rear wheel assembly of this invention.

In the drawings, the letter T designates generally the trailer of this invention which is adapted to be pulled or otherwise moved by a vehicle V such as the usual truck which has a fifth wheel X therewith of conventional construction, or any other vehicle which is capable of pulling or moving a trailer such as the trailer T of this invention. Briefly, the trailer T of this invention includes a body 10 which serves to interconnect a front support means 11 and a rear wheel assembly 12. The front support means 11 serves to support the forward ends of the plates or sheets of steel or other material which are positioned substantially vertically in the area defined by the body 10. The rear wheel assembly 12 serves to support the rearward ends of the plates or sheets. As will be explained more fully hereinafter, the body 10 is provided with means for holding the plates or sheets indicated by the dotted lines in Fig. 1 and identified by the letter P, in the desired substantially vertical position for transportation. Also, the body 10 is provided with means for reducing or enlarging the length thereto to change the position of the wheel assembly 12 with respect to the forward support means 11, the purpose of which will be more evident from the following description.

Considering the invention now more in detail, the body 10 includes a pair of longitudinally extending laterally spaced tubular members, each of which is formed in two tubular sections 15a and 15b (Figs. 1–3). The tubular sections 15a are formed with a hollow bore which is of a greater inner diameter than the outer or external diameter of the tubular or pipe sections 15b. Therefore, the tubular sections 15b are adapted to slide into the bore or interior of the tubular sections 15a, as indicated by the dotted line portion of section 15b in Figs. 1 and 2. The sections 15a and 15b of each tubular member are connected during use to prevent their longitudinal movement relative to each other by any suitable clamping means such as the clamps 16 which have bolts 16a therewith for clamping the flanges 16b together to apply a gripping action on both of the tubular sections 15a and 15b of each tubular member. When it is desired to move the tubular sections 15a and 15b relative to each other, the bolts 16a are loosened and the clamping action of the clamp 16 is released so as to permit such telescoping or sliding movement of the tubular section 15b relative to the tubular section 15a of each tubular member. Thus, in Fig. 1 it can be seen that the tubular sections 15b have been moved rearwardly with respect to the tubular sections 15a, but in Fig. 2, the tubular sections 15b have been fully telescoped with respect to the tubular sections 15a. Other types of clamps could of course be utilized, so long as the tubular sections 15a and 15b are releasably clamped together. In some instances, as will be more evident hereinafter, the clamps 16 are unnecessary, but in any event, each tubular member includes the sections 15a and 15b which form the sides of the body 10. The forward end of the body 10 is provided by interconnecting lateral support members 17 which are welded or otherwise secured to the forward inner ends of the tubular sections 15a (Fig. 3). A connecting means 18 having a connecting pin 18a (dotted lines) extending downwardly therefrom is preferably provided for mounting on the conventional fifth wheel X used in conjunction with most trucks of the type illustrated in Fig. 1. Of course, it will be understood that the connection means 18 can vary so that the trailer T of this invention can be pulled or moved by any type of vehicle, whether it has a fifth wheel X or some other means for connecting the connection means 18 thereto. The rear tubular sections 15b are supported on the rear wheel assembly 12, as will be explained. Thus, the body 10 which is composed of the tubular members 15 is supported at its forward end by the vehicle V and at its rear end by the rear wheel assembly 12, and such body 10 extends substantially parallel to the ground or road G over which the trailer T is transported.

The front support means 11 (Figs. 1–3 and 5) is mounted on and is suspended from the forward tubular sections 15a. Such front support means 11 may be formed in numerous ways, but as illustrated in the drawings, the support means 11 has longitudinally spaced side members 20 connected with each tubular pipe section 15a, preferably by having the upper portion 20a of each side member 20 curled or rounded for fitting around the tubular section 15a. Such hook portions 20a may be slidably positioned on the tubular sections 15a or they may be welded or otherwise secured thereto. The oppositely disposed side members 20 are each interconnected with longitudinally spaced bars or support members 21 which are welded or otherwise secured to the lower ends of the side members 20. Preferably, a lower substantially horizontal support plate 22 is mounted on the support bars or members 21 to provide a greater surface area for the contact of the lower edges of the forward ends of the plates or sheets P than would be provided by the bars 21 themselves, but it would be understood that the bars 21 could serve by themselves if so desired. Alternatively, the bars 21 can be omitted and the support plate 22 can be welded or otherwise fixed to the lower ends of the side members 20. In any event, the support plate 22 is provided with a slot 22a for receiving the bottom portions 25a of forward retaining members 25, as will be explained more in detail. In order to limit the forward movement of the plates or sheets P relative to the trailer T during the transportation of such plates or sheets P, the forward support means 11 has a front frame member 23 which, as illustrated in the drawings, is preferably formed with downwardly depending legs 23a which are welded or otherwise secured to the forward edge of the support plate 22. The upper laterally extending bar 23b (Fig. 5) of the front frame member 23 is welded or otherwise secured to the forward edges of the two forward side members 20.

The retaining members 25 are elongate members which extend upwardly above the tubular members 15, and preferably above the upper edges of the largest sizes of plates or sheets P which are to be hauled or transported with the trailer T of this invention. As previously mentioned, the lower ends 25a extend into the slot 22a of the support plate 22, and such lower ends 25a are of a reduced width as indicated in Fig. 1 and they are interconnected with any suitable means for adjusting and maintaining the spacing between the lower portions 25a. In the drawings, a turnbuckle 27 having the usual threaded rod 27a is connected between the lower ends 25a so that upon a rotation of the turnbuckle 27, the ends 25a are either pulled or moved towards or away from each other and are held in such selected position. The width at the lower end of the retaining members 25 is thus controlled so as to accommodate various numbers of the plates or sheets P. It will be understood of course that although the invention is particularly suitable for carrying a plurality of such plates or sheets P, the number of such plates of sheets P can vary, and, in fact, a single plate or sheet P could be carried with the trailer T of this invention.

For further adjusting and maintaining the retaining plates 25 substantially vertical and at a selected width for the particular number of plates or sheets P which are disposed on the trailer T, additional adjusting and maintaining means such as the turnbuckles 28 and 29 are provided, with the turnbuckles 28 extending from a point near the upper part of each of the retaining members 25 to one of the tubular sections 15a. The lower turnbuckles or adjusting and maintaining members 29 extend from the lower part of each of the retaining members 25 to the tubular sections 15a. With such construction, the forward ends of the plates or sheets P are held in a substantially vertical position. It will be understood of course that by the term "substantially vertical position" as used herein, it is meant that such plates P may be exactly vertical or they may be slightly inclined from a true vertical so long as such plates or sheets P are supported on their lower edges rather than being stacked horizontally or flat as in the usual case.

The wheel assembly 12 (Figs. 1–4) includes laterally spaced vertical frame members 30, each of which has a curved longitudinally extending saddle or semi-circular pipe section 31 welded or otherwise connected thereto. Such saddles or curved support plates 31 have a sufficient curvature for receiving the rear tubular sections 15b (Fig. 4) thereon, and preferably bolts 32 or other securing means are utilized for holding the tubular sections 15b in place with respect to the saddles or curved supports 31. The vertical frame members 30 of the wheel assembly 12 are interconnected at their lower ends with longitudinally spaced lateral rods or roller bars 34. Preferably, the ends of the rods or bars 34 are mounted in bearings so that the rods or bars 34 can rotate, but they are connected with the vertical frame members 30 so that such frame members 30 are prevented from shifting laterally relative to each other. Such bars 34 provide the support surface for the lower edges of the rearward ends of the plates or sheets P. Another rod or bar 35 also extends from one of the vertical frame members 30 to the other vertical frame member 30, but normally, such bar 35 is positioned slightly below the support bars 34 so that the steel plates or sheets P do not contact the bar or roller 35. Such rod 35 extends laterally beyond the outer surfaces of the spaced vertical frame members 30 for a purpose to be hereinafter explained. In any event, it will be noted that the vertical frame members 30 and the lateral frame members or supports 34 form a substantially U-shaped assembly which provides an open rear end for the trailer T, and the bar or rod 35 does not interfere with the opening provided between the frame members 30.

The wheel assembly 12 also includes wheels 38 which are of conventional construction. The wheels 38 on each side of the trailer T are positioned in tandem exteriorly of the vertical frame members 30, and they are mounted on stub axles 39. The shafts 39 are carried by the exterior wheel support plate 40 which is positioned exteriorly of the vertical member 30, and also by the interior wheel support plate 41 which is positioned interiorly of the vertical frame member 30. The plates 40 and 41 are preferably identical, and they are provided with upper arcuate surfaces 40a and 41a, respectively. In the preferred form of the invention, the wheel support plates 40 and 41 are not fixed to the center rod 35 but alternatively, they may be fixed to the rod 35 by using welding or other known securing means, such rod 35 serves as the pivot point for the members 40 and 41 as they move together in response to the movements of the wheels 38 as they hit bumps or other surface irregularities on the ground or road G over which they are moved. Thus, with the wheels 38 on the ground G as indicated in Fig. 1, if the forward wheels 38 hit a bump, the wheel support members 40 and 41 would be caused to pivot about the rod 35 as the forward wheels moved upwardly with the raised portion of the ground while the back or rear wheels 38 remain on the normal ground level. The opposite pivoting would occur if the rear wheels 38 are moved upwardly by a bump or raised portion on the ground. The same pivoting action takes place when the plates 40 and 41 are mounted for vertical sliding movement relative to the rod 35 and the frame member 30 as illustrated in the drawings wherein the wheel support members 40 and 41 have slots 40b and 41b, respectively, into which the ends of the rod 35 extend. With such slots 40b and 41b thus formed in the members 40 and 41, respectively, such members 40 and 41 can move vertically with respect to the shaft or rod 35 and the vertical frame members 30. For maintaining the vertical frame members 30 and the parts such as the horizontal frame members 34 which are connected therewith, in a raised position relative to the wheel support members 40 and 41 when the wheels 38 are on the ground G, and more particularly, for absorbing shock loads imparted to the rear wheel assembly when the wheels 38 contact bumps or other surface irregularities in the road or ground G, a resilient means in the form of a coil spring 45 is mounted in a slot 30a of each vertical frame member 30 between the lower surface of each saddle or curve support member 31 and the upper surfaces 40a and 41a of the support members 40 and 41. Preferably, a roller 46 is connected to the lower end of the spring 45 for rolling contact with the upper curved surfaces 40a and 41a. The plates 40 and 41 are therefore limited in their vertical sliding movement with respect to the frame member 30 therebetween, and for that reason, since the plates 40 and 41 cannot move laterally relative to the frame member 30, the plates 40 and 41 remain pivotally and slidably connected to the frame member 30. Thus, assuming the wheels 38 are caused to be bounced or urged upwardly by the contact with a bump or some other surface irregularity in the road or ground G, such shock or impact is imparted to the springs 45 which absorbs or cushions the shock instead of transmitting it directly to the vertical frame members 30, and therefore the shock is greatly reduced or diminished insofar as the plates or sheets P are concerned. It will be appreciated of course that other types of shock absorbers could be utilized other than the coil springs 45, and it will also be appreciated that the upper surfaces 40a and 41a can be flattened for increasing the effectiveness of the spring action by the coil springs 45, if so desired.

For retaining the plates or sheets P in the substantially vertical position on the rear wheel assembly 12, rear retainer members 50 are provided. Such retainer members 50 correspond with the retainer members 25 used at the forward end of the trailer T, and the retainer members 50 can likewise take various forms, but as illustrated in the drawings, the retainer members 50 are each formed with a pair of depending legs 50a (Fig. 1) so that they form an inverted V with the lower ends of the legs 50a having slots or recesses 50b to position same over the rollers 34. Each of the retainer members 50 is thus laterally movable relative to the rear wheel assembly 12 for adjusting the location of same as desired. The lower ends of the legs 50a of each retainer member 50 are preferably anchored to its respective roller 34 after the plates P are in position by the use of U-bolts 52 (Fig. 4) which are of conventional construction. The inclination of the retainer members 50 may be adjusted with upper turnbuckles or other adjusting and maintaining members 53 and with lower turnbuckles or adjusting and maintaining members 54. It will be noted from Fig. 3 that the lower turnbuckles 54 for each retainer member 50 are preferably two in number and are positioned in a diagonally spaced relationship as best seen in Fig. 3.

In order to transmit the pull on the body 10 to the wheel assembly 12, a chain 60 is connected from each forward tubular section 15a to each of the inner wheel support members 41 (Fig. 1). The chains are therefore taut when the trailer T is being pulled and the strain of the pulling on the rear wheel assembly 12 is thus taken by such chains 60 which are of relatively great strength. Therefore, due to the fact that such chains 60 are used, the clamps 16 can be eliminated, but the use of such clamps 16 is an additional safety factor. Of course, in some instances it is possible that the clamps 16 can be of sufficient strength and reliability to use such clamps 16 without the use of the chains 60. The chains 60 also serve another purpose in that when the trailer T is empty (Fig. 2) it is desirable to raise the forward wheels 38 off the ground G to reduce the wear on such wheels. With the chains 60, this is accomplished by passing each chain 60 through a hook or loop 65 which is suspended from a spring 66 on each of the rear tubular members 15b. The chains 60 may also be reconnected so as to be shortened as indicated in Fig. 2. With the chains 60 thus passing through the hooks 65, the forward wheels 38 on each side of the trailer T are raised to the position shown in Fig. 2. The springs 66 provide a resilient support to further compensate for shock and impacts imparted to the rear wheels 38 during the travel of the trailer T when it is empty. If the load of the plates P is very light and is relatively short, the same procedure for lifting the forward wheels 38 can be utilized as in the case when the trailer T is actually completely empty.

The use or operation of the trailer T of this invention is believed evident from the foregoing description. Thus, prior to the loading of the plates or sheets P into position on the trailer T, the length of the trailer T is adjusted so that the rear edges of the plates or sheets P do not extend beyond the rear wheels 38. The clamps 16 are then clamped tightly to retain the tubular sections 15a and 15b at the selected length or position. Also, each of the chains 60 is connected between each tubular section 15a and each rear wheel support member 41 so that such chains 60 are taut. The plates or sheets P are loaded with a conventional crane, but instead of requiring magnets as when the plates are loaded in a horizontal or flat position, the plates P can be handled with chains from the crane, whereby a greater load or weight of the plates P can be handled, due to the fact that the magnets which are normally used must be considered as part of the weight being handled by the crane in the usual case, and such weight of the magnets is eliminated when handling the plates in the vertical position. When the plates P are positioned on the trailer T, they may be loaded from the open rear end of the trailer T, or they may be lowered downwardly through the open upper end of such trailer T to position the edges of the forward ends of the plates P on the support plate 22 of the forward support means 11 and the edges of the rear portions of the plates P on the laterally extending frame members or rollers 34 of the rear wheel assembly 12. It should be noted that the lower edges of the plates P are thus positioned substantially parallel to the ground surface and are positioned very low to the ground so that extremely wide plates can be handled with the trailer T of this invention. The location of the lower support plate 22 in substantially the same horizontal plane as the upper surfaces of the rollers 34 makes such positioning of the plates P possible. The forward ends of the plates P contact the forward stop wall or plate 23 so that such plates are squared or aligned with respect to their forward edges. The lower edges are also squared or aligned so that all of the plates are positioned with their edges in alignment, assuming the plates P are the same size. In any event, the forward and the lower edges of the plates P are in alignment, which is a definite advantage in the handling of the plates P during the loading and the unloading of same and during the subsequent pickling of the sheets after they are unloaded.

The forward retainer members 25 are then suitably moved inwardly into contact with the outer plates or sheets P and are clamped to retain such members 25 in position for holding the plates P substantially vertical. Likewise, the rear retainer members 50 are moved inwardly toward each other into contact with the outer plates or sheets P for maintaining the rear portions of the plates P in the substantially vertical position.

As the trailer T is pulled over the ground or road G, it is of course permitted to pivot at its connection means 18 by means of the fifth wheel X, in the well known manner to enable the vehicle V to turn corners and to make curves in the road or highway without upsetting the trailer T. The pull on the forward part of the body 10 is transmitted to the rear wheel assembly 12 through the chains 60, and in some cases, through the clamping means 16 to the bolts 32 which extend from the rear tubular members 15b to the saddles or curved support members 31 of the rear assembly 12. The weight of the plates P can be balanced by adjusting the position of the rear wheel assembly 12 with respect to the forward support means 11 if necessary. Since the lateral frame members 34 are rollers, the rear wheel assembly 12 can be moved forwardly or rearwardly with respect to the plates P while they remain stationary on the front support means 11. However, under ordinary circumstances, such adjustment of the rear wheel assembly 12 after positioning the plates P thereon will not be necessary. As previously explained, the rocking action of the wheels 38 and also the absorbing of the shock or impacts imparted to the wheels 38 is obtained with the particular construction of the rear wheel assembly 12 so that substantially no shock or impact is imparted to the plates or sheets P.

When the plates or sheets P are to be unloaded, the clamps 16 are released from their clamping action, if such clamps 16 are utilized, the rear wheel assembly 12 is held against rearward movement and then the vehicle V is backed up or is moved rearwardly to cause the front support means 11 to move rearwardly. The rear tubular members 15b thus are caused to telescope or slide inwardly relative to the forward tubular sections 15a as the forward support means 11 is moved rearwardly relative to the rear wheel assembly 12. The forward wall 23 on the support means 11 forces the plates P rearwardly and causes same to roll on the rollers 34 so that the plates P are pushed rearwardly with respect to the wheel assembly 12 to cause same to move a sufficient distance from the rear end of the wheel assembly 12 to then place the major portion of the weight of the plates P to the rear of the trailer T. With such positioning of the plates P to the rear, the plates are readily unloaded while retaining same in the substantially vertical position. Since the plates are in the substantially vertical position, they can be readily separated from each other as compared to the difficult separation which is encountered when trying to separate horizontally stacked plates. When the plates P have been removed, the tubular sections 15a and 15b are telescoped (Fig. 2) and then for transporting the trailer T in the empty condition, the clamps 16 are again connected, and the forward wheels 38 are raised by hooking the chains 60 through the hooks 65 as shown in Fig. 2 so that the trailer T can then be pulled in the empty condition back to its location for receiving a new load of the plates or sheets P.

It should be noted that it is possible to load the plates or sheets P by positioning same on the trailer T when it is in the collapsed or telescoped position of Fig. 2 and then by holding the rear wheel assembly 12 against forward movement, the forward support means 11 is moved forwardly by the movement of the vehicle V until the rear portions of the plates are substantially in the position shown in Fig. 1, at which time the forward movement of the vehicle V is stopped and the chains 60 are connected, and also the clamping means 16 are connected so that the plates P can then be clamped with the retaining members 25 and 50 for hauling as previously described. It should be further noted that the lateral frame members or rollers 34 do not rock or pivot when the wheels 38 rock or pivot upon contact with bumps or other surface irregularities in the road or ground G. Thus, the rear support for the rear portions of the plates P remains substantially horizontal regardless of the surface irregularities in the ground or road which are encountered by the wheels 38 during the transportation of the plates or sheets P with the trailer T of this invention.

In Fig. 6 a portion of a modified rear wheel assembly 12 is illustrated. One of the rear tubular sections 15b is shown in Fig. 6 as being supported on a curved support member or saddle 131 which corresponds with each of the saddles or curved support members 31 of Figs. 1–4. Bolts or other retaining means 132 by which corresponds with the bolts 32 of Figs. 1–4 are utilized in Fig. 6 for connecting the tubular section 15b to the support member 131. The support member 131 is welded or otherwise connected to a vertical frame member 130 of the rear wheel assembly 112. Only one wheel 138 is mounted on each side of each of the vertical frame members 130 in the form of the invention illustrated in Fig. 6. The frame members 130 are interconnected by a suitable shaft or rod 135 which is mounted in any suitable known type of bearing 135a connected to each of the laterally spaced vertical support members 130. If it is desired to provide for the absorbing of shocks or impacts imparted to the wheels 138 during the transportation of the plates or sheets P with the trailer T of this invention, resilient members such as coil springs 145 and 145a may be positioned above and below the shaft or roller 135 in a longitudinal slot 130a formed in each vertical frame member 130. Thus, either upward or downward movement of the shaft 135 with the wheels 138 relative to the frame members 130 is absorbed and resisted by the springs 145 or 145a. Other known types of shock absorbers could be utilized instead of the springs 145 and 145a, as will be understood.

It should be understood that although the invention herein is particularly suitable for the hauling or transportation of plates or sheets of steel, the material of the plates or sheets may vary considerably while still obtaining the many advantages of this invention. For example, the plates or sheets may be plywood, glass, plastic or various types of metal. One of the advantages of the invention resides in the fact that the trailer construction itself is extremely light as compared to the conventional trailer construction. Due to the fact that most States have limitations as to the amount of weight which can be hauled or transported, by reducing the weight of the trailer construction itself, greater amounts of weight in the material being hauled such as the plates or sheets P are possible without exceeding the maximum limitations. Furthermore, it is believed evident that the trailer T of this invention provides a relatively short wheel base as compared to presently known devices of this type, which adds maneuverability to the trailer construction T within plants as well as on the highway, and less wind resistance is offered by the trailer construction T which of course will decrease the fuel cost during the transportation of the plates or sheets P. Thus it can be seen that the invention herein has numerous advantages in addition to those previously described, and of course, the invention has other advantages which will be evident to those skilled in the art.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a trailer for plates or sheets, a rear wheel assembly comprising a frame having substantially vertically extending rigid non-collapsible frame members laterally spaced from each other and interconnected with a laterally extending frame member, said laterally extending frame member acting as a support for plates or sheets, a wheel support plate for each vertical frame member, a pivotal connection means between each of said vertically extending frame members and each wheel support plate, a pair of wheels mounted on each wheel support plate on opposite sides of the pivotal connection of each wheel support plate to each vertical frame member whereby a rocking motion of each pair of wheels about said pivotal connection means is permitted as bumps or other irregularities in the road are encountered but without rocking said frame, means for mounting each of said wheel support plates for vertical sliding motion relative to each vertical frame member, and resilient means between each vertical frame member and each wheel support plate for absorbing the shocks of the vertical movements of said wheel support means and for limiting the vertical movement of said wheel support means.

2. A wheel assembly, comprising a pair of wheels, a wheel support plate having a slot formed therein, axles on said plate for mounting said wheels for rotation relative thereto, a frame member having a guide rod extending therefrom and into said slot to guide the movement of said plate relative to said frame member for permitting pivotal movement of said support plate relative to said frame member and also substantially vertical relative movement therebetween, said support plate having said slot formed in its lower portion intermediate said axles, said support plate also having an arcuate upper surface, a roller in contact with said upper surface, and resilient means mounted on said frame member in contact with said roller for urging said roller into engagement with said upper surface whereby vertical relative movement between said plate and said frame member is cushioned without interfering with the pivotal movement of said plate relative to said frame member.

3. A wheel assembly, comprising a pair of wheel support plates, means securing said plates together and laterally spaced from each other, a substantially vertically extending frame member positioned between said support plates, one of said support plates having a guide slot formed therein, a shaft connected to said frame member and extending into said guide slot, one of said support plates having an arcuate guide surface, a roller adapted to engage said guide surface, and resilient means on said frame member for urging said roller into engagement with said guide surface.

References Cited in the file of this patent

UNITED STATES PATENTS

| | | |
|---|---|---|
| 666,733 | Butler | Jan. 29, 1901 |
| 1,106,104 | Marx | Aug. 4, 1914 |
| 2,156,876 | Scull | May 2, 1939 |
| 2,391,948 | Couse | Jan. 1, 1946 |
| 2,493,004 | Mackie | Jan. 3, 1950 |
| 2,564,702 | Linneman | Aug. 21, 1951 |
| 2,727,758 | Smith | Dec. 20, 1955 |
| 2,748,965 | Grey | June 5, 1956 |
| 2,767,999 | Gouirand | Oct. 23, 1956 |
| 2,775,466 | Meewes | Dec. 25, 1956 |
| 2,795,432 | Martt | June 11, 1957 |
| 2,906,358 | Tucker | Sept. 29, 1959 |